(12) United States Patent
Majidi et al.

(10) Patent No.: US 7,709,087 B2
(45) Date of Patent: May 4, 2010

(54) COMPLIANT BASE TO INCREASE CONTACT FOR MICRO- OR NANO-FIBERS

(75) Inventors: Carmel Majidi, Berkeley, CA (US); Richard E. Groff, Central, SC (US); Ronald S. Fearing, Orinda, CA (US); Steven D. Jones, Lafayette, CA (US)

(73) Assignee: The Regents of the University of California, Oakland, CA (US)

(*) Notice: Subject to any disclaimer, the term of this patent is extended or adjusted under 35 U.S.C. 154(b) by 644 days.

(21) Appl. No.: 11/601,528

(22) Filed: Nov. 17, 2006

(65) Prior Publication Data

US 2010/0062208 A1    Mar. 11, 2010

Related U.S. Application Data

(60) Provisional application No. 60/737,939, filed on Nov. 18, 2005.

(51) Int. Cl.
*D02G 3/00*    (2006.01)
(52) U.S. Cl. .................. 428/365; 428/357; 428/364; 428/373; 428/401; 977/724; 977/762
(58) Field of Classification Search .................. 428/99, 428/119, 141, 343, 357, 364, 401, 369–371; 977/724, 732, 734, 742, 750, 752, 762
See application file for complete search history.

(56) References Cited

U.S. PATENT DOCUMENTS

| 4,545,831 A | 10/1985 | Ornstein |
| 4,704,745 A | 11/1987 | Reaver |
| 5,077,870 A | 1/1992 | Melbye et al. |
| 5,264,722 A | 11/1993 | Tonucci et al. |
| 5,392,498 A | 2/1995 | Goulait et al. |
| 5,843,657 A | 12/1998 | Liotta et al. |
| 5,843,767 A | 12/1998 | Beattie |
| 5,951,931 A | 9/1999 | Murasaki et al. |
| 5,959,200 A | 9/1999 | Chui et al. |

(Continued)

FOREIGN PATENT DOCUMENTS

JP    2002-307398 A    10/2002

(Continued)

OTHER PUBLICATIONS

Tong, T. et al. (Sep. 22-24, 2004). "Multiwalled Carbon Nanotube/Nanofiber Arrays as Conductive and Dry Adhesive Interface Materials," *Proceedings of the 3rd ASME Integrated Nanosystems Conference: Design, Synthesis, and Applications*, pp. 7-12.

(Continued)

*Primary Examiner*—D. L Tarazano
*Assistant Examiner*—Matthew D Matzek
(74) *Attorney, Agent, or Firm*—Morrison & Foerster LLP (57) ABSTRACT

A fabricated microstructure includes a substrate, a primary fiber, and a plurality of base fibers. The primary fiber has a width less than about 5 microns. Each base fiber of the plurality of base fibers has a first end attached to the primary fiber and a second end attached to the substrate. Each base fiber has a width less than the width of the primary fiber.

22 Claims, 8 Drawing Sheets

U.S. PATENT DOCUMENTS

| | | | |
|---|---|---|---|
| 6,055,680 | A | 5/2000 | Tolbert |
| 6,393,327 | B1 | 5/2002 | Scribner |
| 6,713,151 | B1 | 3/2004 | Dean et al. |
| 6,722,026 | B1 | 4/2004 | Lent |
| 6,737,160 | B1 | 5/2004 | Full et al. |
| 6,872,439 | B2 | 3/2005 | Fearing et al. |
| 6,913,075 | B1 | 7/2005 | Knowles et al. |
| 7,011,723 | B2 | 3/2006 | Full et al. |
| 7,056,409 | B2 | 6/2006 | Dubrow |
| 7,132,161 | B2 | 11/2006 | Knowles et al. |
| 7,144,624 | B2 | 12/2006 | Knowles et al. |
| 7,175,723 | B2 | 2/2007 | Jones et al. |
| 7,181,811 | B1 * | 2/2007 | Tomanek et al. .............. 24/442 |
| 7,229,685 | B2 | 6/2007 | Full et al. |
| 2003/0124312 | A1 | 7/2003 | Autumn |
| 2004/0009353 | A1 | 1/2004 | Knowles et al. |
| 2004/0076822 | A1 | 4/2004 | Jagota et al. |
| 2005/0119640 | A1 | 6/2005 | Sverduk et al. |
| 2005/0181170 | A1 | 8/2005 | Fearing et al. |
| 2006/0078725 | A1 | 4/2006 | Fearing et al. |
| 2006/0202355 | A1 | 9/2006 | Majidi et al. |

FOREIGN PATENT DOCUMENTS

| | | | |
|---|---|---|---|
| WO | WO-99/32005 | A1 | 7/1999 |
| WO | WO-01/49776 | A2 | 7/2001 |
| WO | WO-03/095190 | A2 | 11/2003 |
| WO | WO-2005/033237 | A2 | 4/2005 |
| WO | WO-2006/060149 | A2 | 6/2006 |
| WO | WO-2006/094025 | A2 | 9/2006 |
| WO | WO-2006/130864 | A2 | 12/2006 |
| WO | WO-2007/040563 | A2 | 4/2007 |
| WO | WO-2007/061854 | A2 | 5/2007 |

OTHER PUBLICATIONS

Zhao, Y. et al. (Jan./Feb. 2006). "Interfacial Energy and Strength of Multiwalled-Carbon-Nanotube-Based Dry Adhesive," *Journal of Vacuum Science & Technology B* 24(1):331-335.

Autumn, K. et al. (Jun. 2000). "Adhesive Force of a Single Gecko Foot-Hair," *Nature* 405:681-685.

Campolo, D. et al. (2003). "Fabrication of Gecko Foot-Hair like Nano Structures and Adhesion to Random Rough Surfaces," *IEEE Third IEEE Conference on Nanotechnology*, pp. 856-859.

Cartmill, M. (1985). "Climbing" Chapters 5 *In Functional Vertebrate Morphology*. Hildebrand, M. et al. eds., The Belknap Press of Harvard University Press: Cambridge, MA, pp. 73-88.

Edwards, J. S. (Oct. 1962). "Observations on the Development and Predatory Habit of Two Reduviid heteroptera, Rhinocoris carmelita stal and Platymeris rhadamanthus gerst," *The Proceedings of the Royal Entomological Society of London* 37:89-98.

Edwards, J. S. et al. (1970). "The Adhesive Pads of Heteroptera: A Re-Examination," *The Proceedings of the Royal Entomological Society of London* 45:1-5.

Gere, J. M. et al. (1984). *Mechanics of Materials*. Second Edition, Brooks/Cole Engineering Division: Monterey, California, 8 pages. (Table of Contents).

Glassmaker, N. J. et al. (Sep. 15, 2004). "Elastica Solution for a Nanotube Formed by Self-Adhesion of a Folded Thin Film," *Journal of Applied Physics* 96(6):3429-3434.

Hora, S. L. (1923). "The Adhesive Apparatus on the Toes of certain Geckos and Tree-frogs," *Journal of the Asiatic Society of Bengal* 9:137-145.

Ikuta, K. et al (1994). "Three Dimensional Micro Integrated Fluid Systems (MIFS) Fabricated by Stereo Lithography," *IEEE Workshop on Micro Electro Mechanical Systems*, pp. 1-6.

International Search Report and Written Opinion mailed Jun. 5, 2007, for PCT Application No. PCT/US06/44697 filed Nov. 17, 2006, 7 pages.

Irschick, D. J. et al. (1996). "A Comparative Analysis of Clinging Ability Among Pad-Bearing Lizards," *Biological Journal of the Linnean Society* 59:21-35.

Janra (Oct. 18, 2002). "Gecko Feet In-Hair-Ently Sticky (Science)," located at <http://www.kuro5shin.org/?op=displaystory;sid=2002/10/18/03840/816> visited on Nov. 17, 2005, (12 pages).

Liang, Y. A. et al. (Jun. 2000). "Adhesion Force Measurements on Single Gecko Setae," *Technical Digest of the 2000 Solid-State Sensor and Actuator Workshop*, Hilton Head Island, SC, pp. 33-38.

Maderson, P. F. A. (Aug. 1964). "Keratinized Epidermal Derivatives as an Aid to Climbing in Gekkonid Lizards," *Nature* 203:780-781.

Mahendra, B. C. (1941). "Contributions to the Bionomics, Anatomy, Reproduction and Development of the Indian House-Gecko, *Hemidactylus flaviviridis* Ruppel," *Proceedings of the Indian Academy of Science*, pp. 288-306.

Paul, R. C. (Oct. 21, 1999). "How Do Flies and Other Insects Walk Up Walls, Ceilings and Even Apparently Smooth Glass Windows?," located at <http://www.sciam.com/askexpert_question.cfm?articleID=00053735-601D-1C72-9EB7809EC588F2D7> visited on Jun. 15, 2007. (3 pages).

Peterson, J. A. et al. (Jul. 1981). "A Case History in Retrograde Evolution: The Onca Lineage in Anoline Lizards. II. Subdigital Fine Structure," *Bulletin of the Museum of Comparative Zoology* 149(4):215-268.

Pursel, S. et al. (2005). "Growth of Sculptured Polymer Submicronwire Assemblies by Vapor Deposition," *Polymer* 46:9544-9548.

Ruibal, R. et al. (Nov. 1965). "The Structure of the Digital Setae of Lizards," *Journal of Morphology* 117: 271-294.

Russell, A. P. (1975). "Contribution to the Functional Analysis of the Foot of the Tokay, Gekko gecko (Reptilla: Gekkonidae)," *Journal of Zoology London* 176:437-476.

Spice, B. (Jul. 7, 2003). "Scientists Unravel Mystery of Gecko's Sticky Feet," post-gazette.com Health & Science, located at <http://www.post-gazette.com/healthscience/20030707gecko0707p2.asp> visited on Jun. 19, 2007. (4 pages).

Stork, N. E. (Mar. 1980). "A Scanning Electron Microscope Study of Tarsal Adhesive Setae in the Coleoptera" *Zoological Journal of the Linnean Society* 68: 173-306.

Stork, N. E. (Oct. 1980). "Experimental Analysis of Adhesion of Chrysolina polita (Chrysomelidae: Coleoptera) on a Variety of Surfaces," *Journal of Experimental Biology* 88: 91-107.

Supplemental European Search Report mailed Nov. 3, 2004, for European Application No. 00993217.9 filed Dec. 11, 2000, 3 pages.

Thurn-Albrecht, T. et al. (Dec. 2000). "Ultrahigh-Density Nanowire Arrays Grown in Self-Assembled Diblock Copolymer Templates," *Science* 290:2126-2129.

Timoshenko, S. P. et al. (1961). "Large Deflections of Buckled Bars (The Elastica)" Ch. 2.7 *In Theory of Elastic Stability*. Second Edition, McGraw-Hill Book Company, Inc.: New York, NY, pp. 76-82.

U.S. Appl. No. 11/365,094, filed Feb. 28, 2006 for Kellar et al.

Williams, E. E. (Mar. 1982). "Convergent and Alternative Designs in the Digital Adhesive Pads of Scincid Lizards," *Science* 215: 1509-1511.

\* cited by examiner

Laterally Constrained

FIG. 3A
FIG. 3B
FIG. 3C

Laterally Unconstrained

COMPLIANT BASE TO INCREASE CONTACT FOR MICRO- OR NANO-FIBERS

CROSS REFERENCE TO RELATED APPLICATION

The present application claims the benefit of U.S. Provisional Application Ser. No. 60/737,939, filed Nov. 18, 2006, which is incorporated herein by reference in its entirety.

STATEMENT REGARDING FEDERALLY SPONSORED RESEARCH OR DEVELOPMENT

This invention was made with Government support under Grant (contract) Nos. N66001-00-C-8047 and N6600101-C-8072 awarded by the US Defense Advanced Research Project Agency and Grant (contract) No. EEC-0304730 awarded by the National Science Foundation. The Government has certain rights in this invention.

BACKGROUND

1. Field

The present application relates generally to the fabrication and utilization of micron or nano scale structures. More particularly, this application relates to using a compliant base to increase contact for micro- or nano-fibers.

2. Related Art

There is an ongoing need for improved adhesives. Improved adhesives have applications ranging from everyday aspects of life (e.g., tape, fasteners, and toys) to high technology (e.g., removal of microscopic particles from semiconductor wafers, transporting fiber optic devices, and assembly of sub-mm mechanisms, particularly those including micro-fabricated components, or components that cannot tolerate grippers, adhesives, or vacuum manipulators).

Adhesive mechanisms in nature have been studied, but have not been fully understood or exploited. For example, Geckos are exceptional in their ability to rapidly climb up smooth vertical surfaces. The mechanism of adhesion used in Geckos, Anolis lizards, some skinks, and some insects, has been debated for nearly a century.

While some prior work has identified the morphology of seta used by Geckos and other insects, this prior work does not identify how the seta operates. In addition, this prior work fails to identify how to use a seta to perform useful work.

It would be highly desirable to identify and exploit the adhesive force mechanism utilized by Geckos and other insects. Such information could result in the utilization of new adhesive microstructures and the fabrication of such structures.

SUMMARY

In one exemplary embodiment, a fabricated microstructure includes a substrate, a primary fiber, and a plurality of base fibers. The primary fiber has a width less than about 5 microns. Each base fiber of the plurality of base fibers has a first end attached to the primary fiber and a second end attached to the substrate. Each base fiber has a width less than the width of the primary fiber.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention or applications thereof, but instead provides examples and illustrations.

Figure 1:
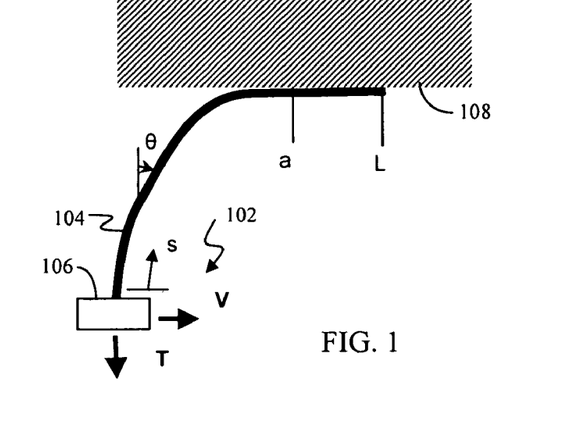
FIG. 1 illustrates a fabrication microstructure attached to a substrate.

With reference to FIG. 1, in one exemplary embodiment, a fabricated microstructure 102 includes a micro- or nano-fiber 104 attached to a substrate 106. In the present exemplary embodiment, fiber 104 is formed from a stiff polymer with elastic modulus greater than 500 megapascal (MPa), such as epoxy. Substrate 106 is formed from a soft polymer with elastic modulus less than 10 MPa, such as silicone rubber, polydimethylsiloxane (PDMS), soft polyurethane, and the like. Substrate 106 can be formed from any compliant material, such as a cloth-like material (i.e., an arrangement of woven fibers that allows small motion relative to one another). It should be recognized, however, that fiber 104 and substrate 106 can be formed from various types of materials.

As depicted in FIG. 1, fiber 104 can adhere in shear to a contact surface 108 by making contact along its side. Fabricated microstructure 102 has been found to exhibit enhanced friction and adhesion properties. See, U.S. Patent Application Ser. No. 60/629,799, titled NANOSTRUCTURED FRICTION ENHANCEMENT USING FABRICATED MICROSTRUCTURE, filed on Nov. 19, 2004, which is incorporated herein by reference in its entirety, and U.S. patent application Ser. No. 10/197,763, titled ADHESIVE MICROSTRUCTURE AND METHODS OF FORMING SAME, filed on Jul. 17, 2002, which is incorporated herein by reference in its entirety.

In the present exemplary embodiment, assume that fiber 104 has a length L, radius R, elastic modulus E, and work of adhesion w per unit length of contact with contact surface 108. The width of fiber 104 (i.e., 2×R) is less than about 5 microns. As depicted in FIG. 1, assume that fiber 104 makes contact with contact surface 108 over a length L-a, where a is the non-contact length of fiber 104. Assume also that function θ(s) is defined to be the slope of fiber 104 along the arc length s from substrate 106.

In accordance with one analytic approach, fiber 104 is treated as an elastica, i.e., an elastic rod that is subject to large deflections in a plane. See, J. M. Gere and S. P. Timoshenko, *Mechanics of Materials* 2nd ed., PWS-KENT Publishing Company, 1984, which is incorporated herein by reference in its entirety. It is assumed that fiber 104 can slide freely with respect to contact surface 108 prior to side contact. Side contact begins when the tip of fiber 104 is oriented laterally, i.e., θ(L)=π/2.

Assume that fiber 104 is pulled away from the substrate by a force T in the direction normal to contact surface 108. The peel strength is defined as the maximum normal force applied to fiber 104 prior to complete detachment of fiber 104 from contact surface 108. From fracture mechanics, the normal force is determined as the critical load at which the work of adhesion is equal to the path independent J-integral calculated near the crack tip, i.e., the edge of the contacting interface. For an elastica, the J-integral is evaluated as:

$$J=(2M_a^2)/(\pi ER^4)$$

where $M_a=M(a)$ is the internal moment acting near the crack tip. See, N. J. Glassmaker and C. Y. Hui, *Elastica Solution for a Nanotube Formed by Self-Adhesion of a Folded Thin Film*, Journal of Applied Physics, v. 96, 3429-3434 (2004), which is incorporated herein by reference in its entirety.

The following analyses will demonstrate the dependence of peel strength on the support conditions at the base of fiber 104, i.e., where fiber 104 attaches to substrate 106. For the purpose of these analyses, it is convenient to express the peel strength ($T_{nd}$) and work of adhesion parameters ($w_{nd}$) in the non-dimensional forms:

$$T_{nd}=(4TL^2)/(\pi ER^4) \text{ and}$$

$$w_{nd}=(4wL^2)/(\pi ER^4),$$

respectively.

1. Rotationally and Laterally Constrained Base

Figure 2A:
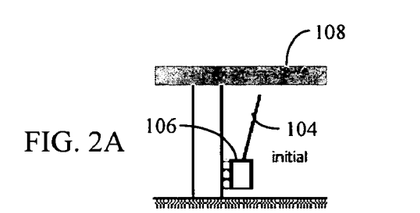
FIG. 2A illustrates an exemplary fiber that is rotationally and laterally constrained at its base.
Figure 2B:
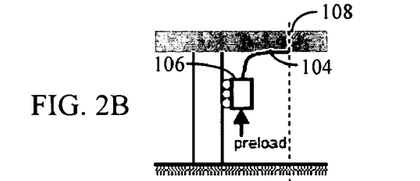
FIG. 2B illustrates the exemplary fiber of FIG. 2A being preloaded.
Figure 2C:
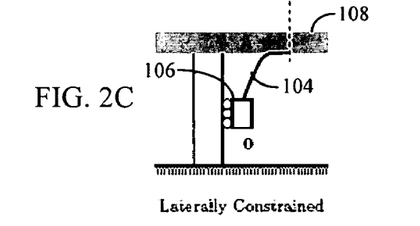
FIG. 2C illustrates the exemplary fiber of FIG. 2A adhering to a contact surface.

First, consider the case in which fiber 104 is constrained both rotationally and laterally at its base. FIG. 2A depicts a representation of fiber 104 that is rotationally and laterally constrained at its base. FIG. 2B depicts fiber 104 being preloaded to adhere to contact surface 108. FIG. 2C depicts fiber 104 adhering to contact surface 108.

For this system, side contact begins when the tip displaces laterally by an amount 0.763 L. See, S. T. Timoshenko and J. M. Gere, *Theory of Elastic Stability*, 2$^{nd}$ ed., McGraw-Hill Book Company, pg. 79 (1961), which is incorporated herein by reference in its entirety. As depicted in FIG. 1, during pull-off, this relative displacement is maintained by a lateral reaction force V acting on the base of fiber 104.

By the constitutive law for an elastica, the internal moment (M) is related to the fiber curvature by the equation:

$$M(s)=(\pi ER^4/4)(d\theta/ds).$$

Hence, the equilibrium condition J=w implies $(d\theta/ds)_{s=a}=(1/L)(2w_{nd})^{1/2}$. Fiber 104 is also subject to the additional boundary conditions θ(0)=0 and θ(a)=π/2 and the governing equation:

$$(\pi ER^4/4)d^2\theta/ds^2 = T\sin(\theta)+V\cos(\theta).$$

Moreover, the reaction force V must satisfy the fourth boundary condition that the integral of sin(θ) over the entire length of fiber 104 should be equal to 0.763 L. Numerically solving the governing equation and four boundary conditions for θ(s), V, and a yields a one-to-one relationship between the normal load T and the non-contact length a. According to this relationship, T increases monotonically with a, and so the peel strength corresponds with the value of T at a=L. The predicted peel strength for various values of $w_{nd}$ is given below in Table 1.

2. Laterally Unconstrained Base

Figure 3A:
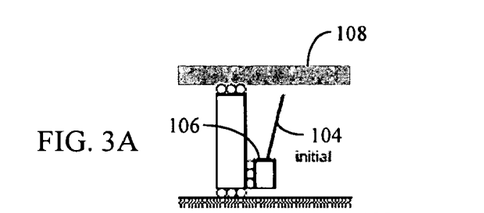
FIG. 3A illustrates an exemplary fiber that is fixed vertically but free to translate laterally.
Figure 3B:
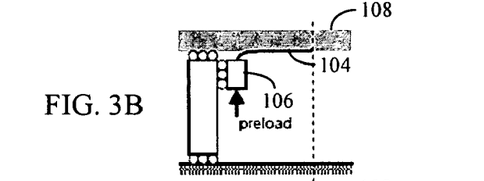
FIG. 3B illustrates the exemplary fiber of FIG. 3A being preloaded.
Figure 3C:
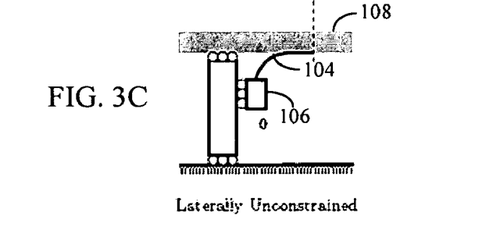
FIG. 3C illustrates the exemplary fiber of FIG. 3A adhering to a contact surface.

Next, consider the case in which the base of fiber 104 is fixed to be vertical but free to translate laterally. FIG. 3A depicts a representation of fiber 104 that is fixed vertically but free to translate laterally. FIG. 3B depicts fiber 104 being preloaded to adhere to contact surface 108. FIG. 3C depicts fiber 104 adhering to contact surface 108. Note that the contact area between the side of fiber 104 and contact surface 108 is greater for the laterally unconstrained case than the laterally constrained case.

The method for determining peel strength is similar to the laterally constrained case above except that V=0 since substrate 106 cannot supply any reaction in the lateral direction. Hence, the governing equation reduces to:

$$(\pi ER^4/4)d^2\theta/ds^2 = T\sin(\theta)$$

subject only to the boundary conditions θ(0)=0, θ(a)=π/2 and $(d\theta/ds)_{s=a}=(1/L)(2w_{nd})^{1/2}$. Solving for θ(s) and a yields the equilibrium relationship:

$$a/L=[2/(w_{nd}-T_{nd})]^{1/2}F(\pi/4,[2/(1w_{nd}/T_{nd})]^{1/2})$$

where F(u,k) is the Jacobi integral of the first kind. As in the laterally constrained case, $P_{nd}$ increases monotonically with a, and so the peel strength is the solution to:

$$1=[2/(w_{nd}-T_{nd})]^{1/2}F(\pi/4,[2/(1w_{nd}T_{nd})]^{1/2}).$$

The predicted peel strength for various values of $w_{nd}$ is given below in Table 1.

3. Rotationally Unconstrained Base

Figure 4:
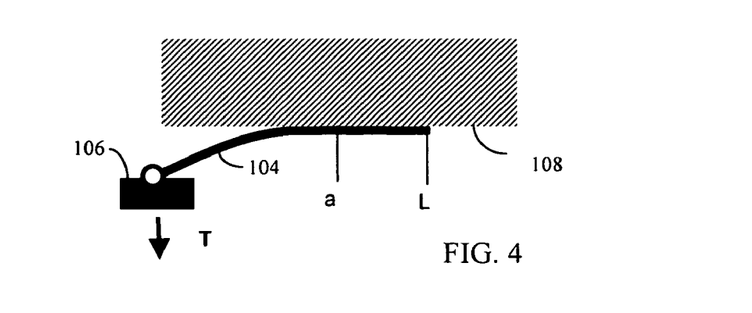
FIG. 4 illustrates an exemplary fiber that is free to rotate at its base.

Lastly, consider the case in which fiber 104 is allowed to rotate freely at its base. FIG. 4 depicts a representation of fiber 104 that is free to rotate at its base.

Following the assumption that fiber 104 can slide with respect to contract surface 108 prior to side contact, fiber 104 can orient itself to make full contact (i.e., a=0) during initial attachment. For this system, M=T*a, and so the equilibrium condition J=w implies:

$$T_{nd}=(L/a)(2w_{nd})^{1/2}.$$

From this expression, T is found to decrease monotonically with a, which suggests that T is smallest when a=L. The predicted peel strength for various values of $w_{nd}$ is given below in Table 1 assuming an initial crack that is five percent of the total fiber length.

TABLE 1

| | Non-dimensional Peel Strength, $T_{nd}$ | | |
|---|---|---|---|
| Non-dimensional Adhesion, $w_{nd}$ | Constrained Support | Laterally Unconstrained Support | Rotationally Unconstrained Support |
| 16.7 | 2.7 | 17.7 | 116 |
| 35.4 | 10.8 | 37.6 | 168 |
| 54.1 | 20.2 | 57.5 | 208 |

4. Alternative Representation of Analysis

With reference again to FIG. 1, in an alternative analytic approach, assume fiber 104 is a cylindrical fiber of length L, radius R, elastic modulus E, Poisson's ratio $\upsilon$, and work of adhesion W (energy per area to separate a flat of the fiber material from a flat of contact surface 108 material) with an applied normal load P. A length of fiber lying free on contact surface 108 will collapse down to give a rectangular shaped contact region with contact surface 108. Energy per unit length $\omega$ for such a contact is computed using a fracture mechanics technique, giving:

$$\omega = 12\left[\frac{2(1-\upsilon^2)R^2 W^4}{\pi E}\right]^{1/3},$$

with corresponding contact width:

$$w = 4\left[\frac{8W(1-\upsilon^2)R^2}{\pi E}\right]^{1/3}.$$

The system is converted to non-dimensional coordinates to simplify analysis. The relevant parameters for the present discussion are:

$$\hat{P} = \frac{PL^2}{EI},$$

$$\hat{\omega} = \frac{\omega L^2}{EI}, \text{ and}$$

$$\hat{a} = \frac{a}{L},$$

where $\hat{P}$ is the non-dimensional load, and $\hat{\omega}$ is the non-dimensional adhesion parameter.

Also, a is the length of fiber not in contact with contact surface 108, and L-a is the length of fiber in contact with contact surface 108. So, $\hat{a}$ is the non-dimensional non-contact length and 1-$\hat{a}$ is the non-dimensional contact length. The shear force required to detach a contact can be approximated as V=$\tau A_r$, where $\tau$ is the shear strength of the interface and $A_r$ is the real area of contact. The real area of contact for a fiber is the contact length times the contact width. Thus contact length gives an approximation of the shear force required to detach a fiber (when pulling in the appropriate direction).

Figure 5:
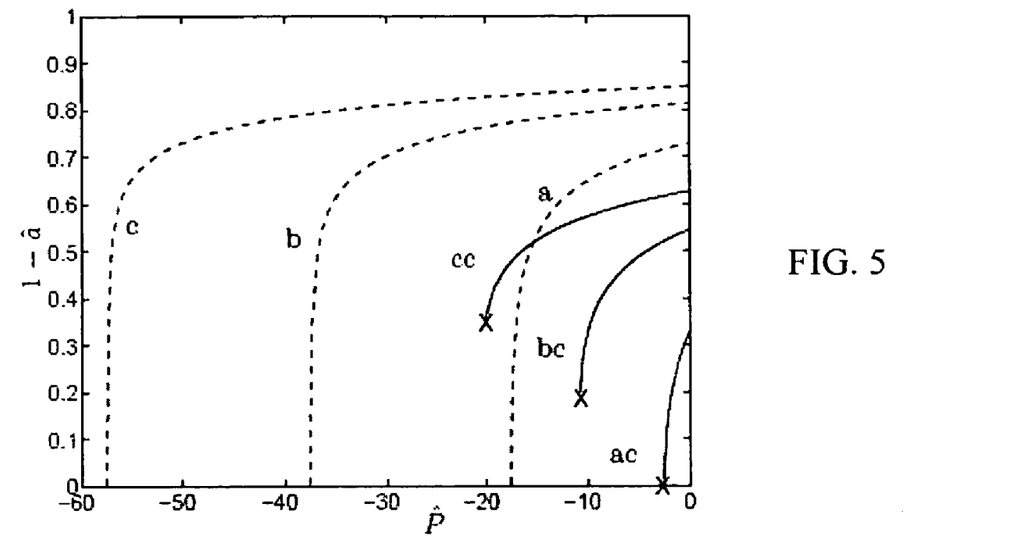
FIG. 5 is a graph depicting the relationship between length of side contact and tensile load on an exemplary fiber.
Figure 6:
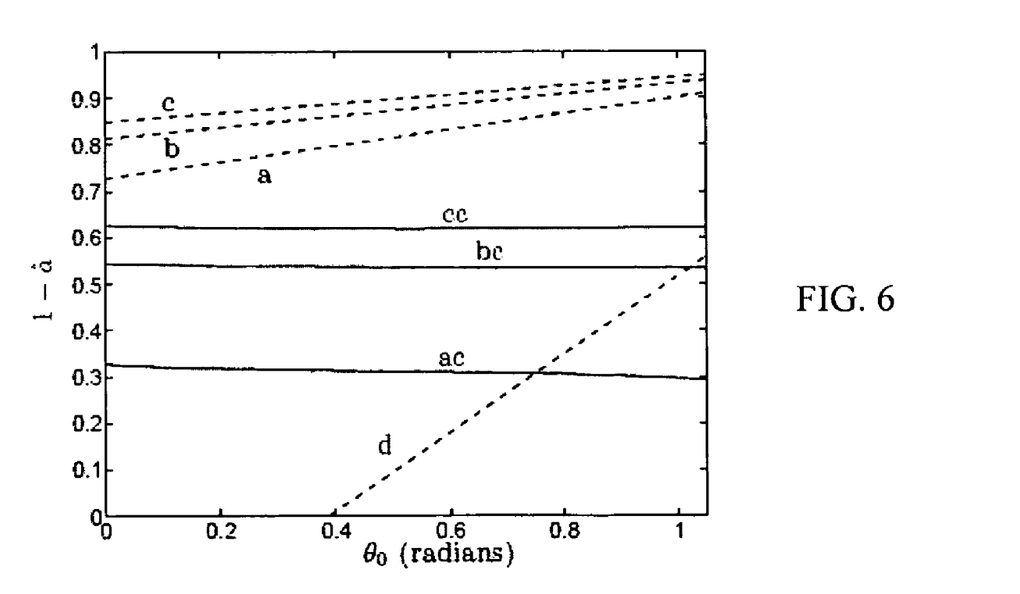
FIG. 6 is a graph depicting the relationship between initial angle at the base of an exemplary fiber and the contact length under zero load.

FIGS. 5 and 6 depict numerical solutions to the system. FIGS. 5 and 6 both depict the unconstrained and constrained support cases of a fiber for three representative values of the non-dimensional adhesion parameter $\hat{\omega}$: 16.7, 35.4, and 54.1. The first two values correspond to epoxy fibers, which are described in D. Campolo, S. Jones, and R. S. Fearing, in Proc. IEEE Nano vol. 2, pp. 856-859, 2003, which is incorporated herein by reference in its entirety, and multi-walled carbon nanotube (MWCNT) fibers, which are described in T. Tong, Y. Zhao, L. Delzet, A. Kashani, and A. Majumdar, Science, in revision (2005), which is incorporated herein by reference in its entirety. Fibers with $\hat{\omega}$ greater than or equal to about 16.7 will be able to maintain side contact in tension.

In particular, FIG. 5 shows the relationship between the length of side contact and the tensile load on a fiber. Notice that for a given tensile load, fibers with a laterally unconstrained base display considerably more side contact. Also, fibers with a laterally unconstrained base have a pull-off force at least twice as high for these values of $\hat{\omega}$. FIG. 6 shows the relationship between initial angle at the base of the fiber and the contact length under zero load. The contact length varies only weakly with angle, but the laterally unconstrained fibers have at least 50% more contact length at zero load for these values of $\hat{\omega}$. A fiber with a low value of $\hat{\omega}$, represented by curve in FIG. 6 with $\hat{\omega}$=0.7, has an unconstrained base that cannot achieve side contact under zero load when its rest configuration is vertical, but placing it at an angle to the base it is able to achieve side contact at zero load. It would not be able to achieve side contact with a constrained base.

5. Design of Supports

Figure 7:
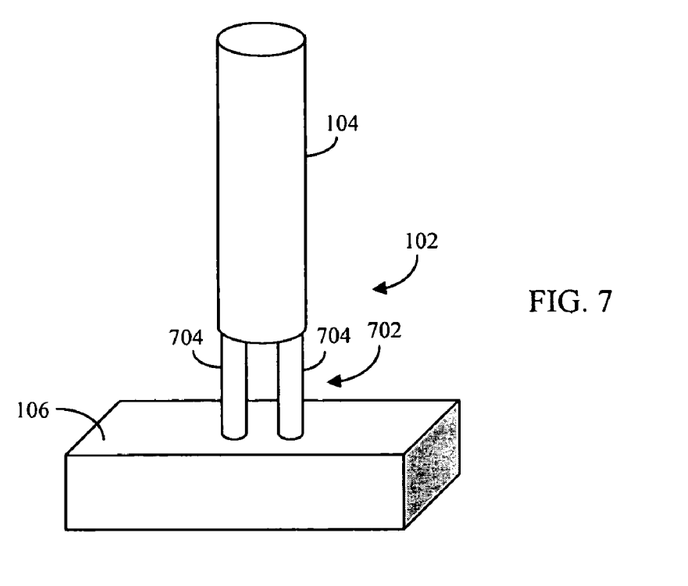
FIG. 7 illustrates an exemplary microstructure with a primary fiber and a plurality of base fibers.

With reference to FIG. 7, in one exemplary embodiment, fabricated microstructure 102 includes a primary fiber 104 with a base 702 comprised of a plurality of base fibers 704. Each base fiber 704 includes one end attached to primary fiber 104 and another end attached to substrate 106.

In the present exemplary embodiment, primary fiber 104 has a width that is greater than width of each base fiber 704. The width of primary fiber 104 is preferably at least 10 times greater than the width of each base fiber 704. The width of base fibers 704 can be the same or different.

FIG. 7 depicts two base fibers 704 attached to primary fiber 104 and substrate 106. It should be recognized, however, that any number of base fibers 704 can be attached to primary fiber 104 and substrate 106.

Figure 8A:
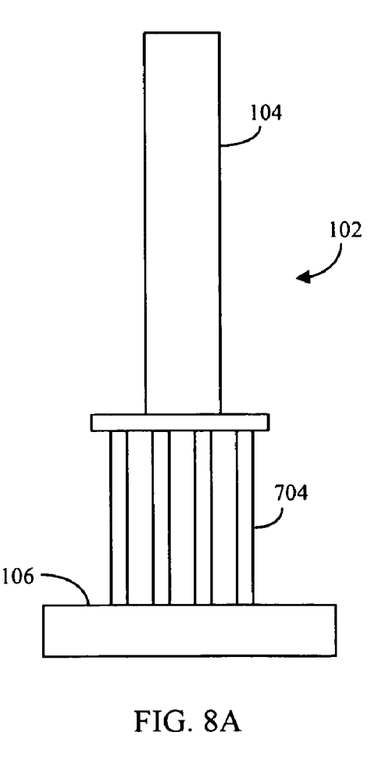
FIGS. 8A and 8B depict an exemplary microstructure with four base fibers.
Figure 8B:
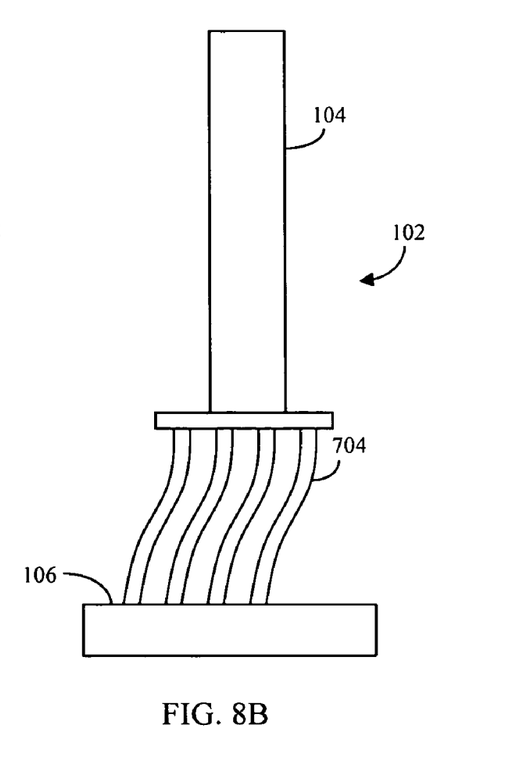

For example, FIG. 8A depicts four base fibers 704 attached to primary fiber 104 and substrate 106. As depicted in FIG. 8B, base fibers 704 permit lateral compliance of primary fiber 104 by lateral bending without buckling subject to fixed end constraints.

Figure 9:
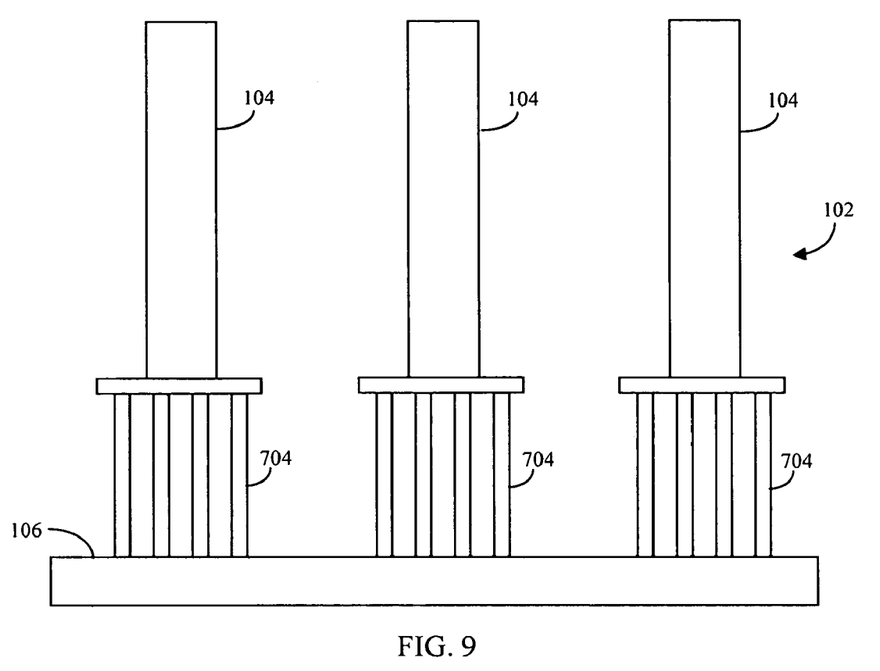
FIG. 9 depicts an exemplary fabricated microstructure with a plurality of primary fibers with each primary fiber having a plurality of base fibers.

With reference to FIG. 9, in one exemplary embodiment, fabricated microstructure 102 includes a plurality of primary fibers 104 with each primary fiber 104 having a plurality of base fibers 704. In the present exemplary embodiment, base fibers 704 are arranged as an array at the end of each primary fiber 104, and the plurality of primary fibers 104 are arranged as an array on substrate 106. Preferably, the two arrays (i.e., the array of base fibers 704 and array of primary fibers 104) have similar area fractions (i.e., the ratio of area with a base fiber 704 or primary fiber 104 to area without a base fiber 704 or primary fiber 104), such as between about 10 to 20 percent.

Figure 10:
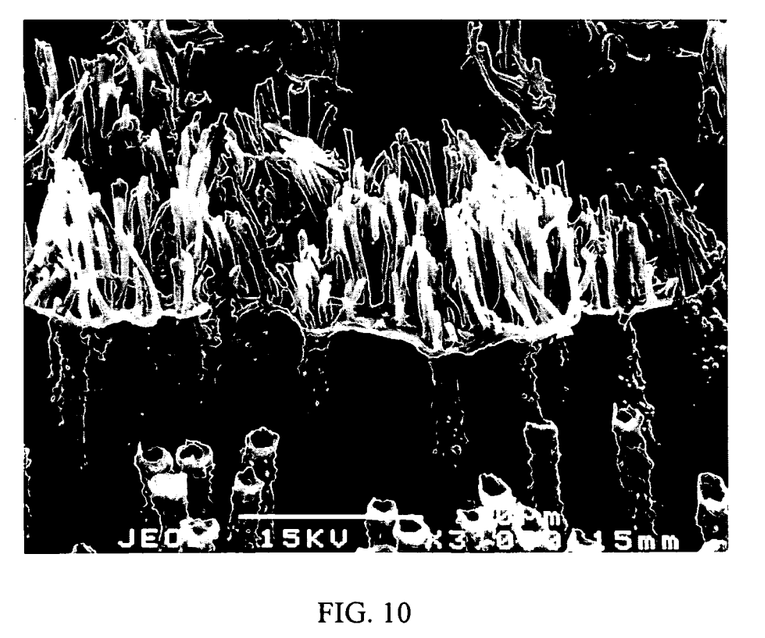
FIG. 10 is a scanning electron microscope image of base fibers and primary fibers formed of polyimide.

Although FIG. 9 depicts the arrays of base fibers 704 and primary fibers 104 in two dimensions, it should be recognized that the arrays can be arranged in three dimensions to permit lateral compliance of primary fibers 104 in any number of lateral directions. For example, FIG. 10 depicts base fibers arranged in an array at the end of primary fibers. FIG. 10 is a scanning electron microscope (SEM) image of base fibers and primary fibers formed of polyimide. Each base fiber has a width of about 0.4 microns. Each primary fiber has a width of about 2.0 microns.

Figure 11A:
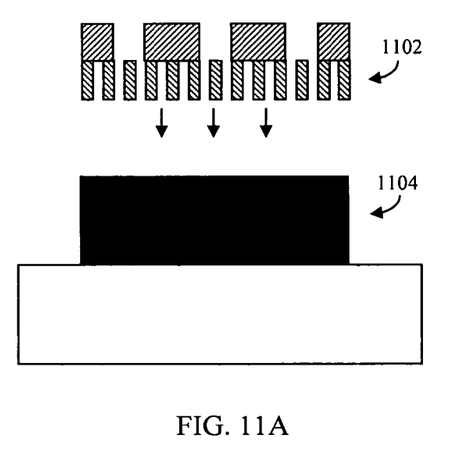
FIGS. 11A-11D depict an exemplary process of forming a fabricated microstructure with an array of primary fibers and arrays of base fibers.
Figure 11B:
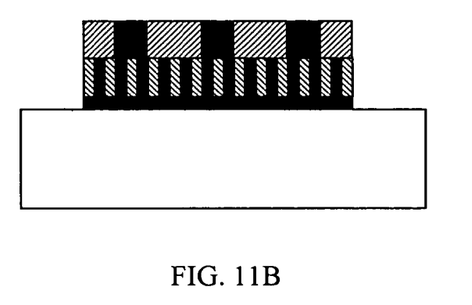
Figure 11C:
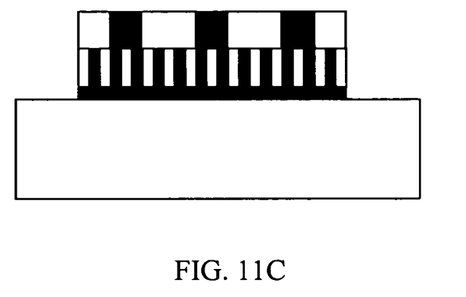
Figure 11D:
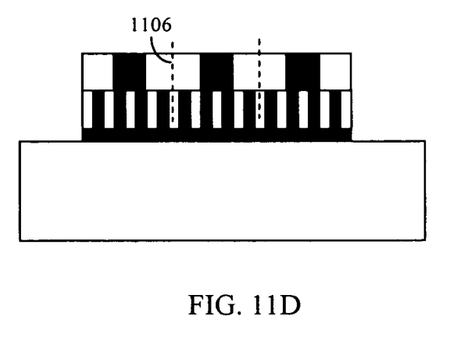

With reference to FIGS. 11A-11D, an exemplary process is depicted of forming a fabricated microstructure with an array of primary fibers and arrays of base fibers. FIG. 11A depicts two porous molds 1102, 1104 with different pore sizes. The pore sizes can range between about 0.1 to 5 microns in diameter. FIG. 11B depicts the stacked molds 1102, 1104 capillary filled with polymer. After the polymer is cured, FIG. 11C depicts stacked molds 1102, 1104 (FIG. 11B) etched away. FIG. 11D depicts the polymer being cut along cut lines 1106 using an ion or e-beam.

Figure 12:
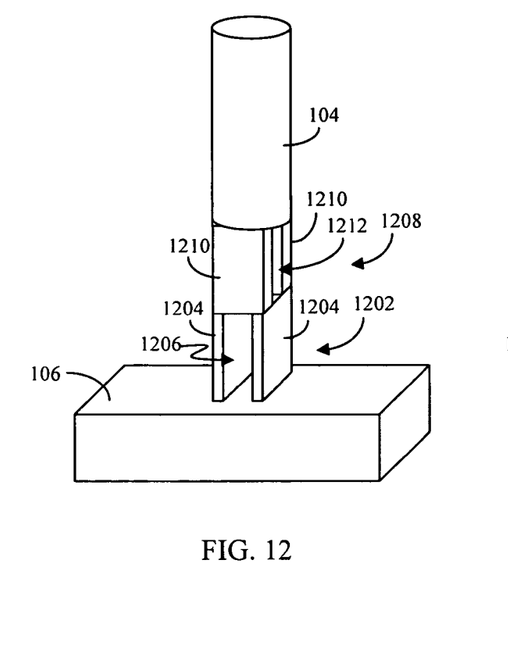
FIG. 12 depicts exemplary base fibers formed as a double cantilever structure.

With reference to FIG. 12, in one exemplary embodiment, the base fibers are formed as a double cantilever structure. As depicted in FIG. 7, the base of fiber 104 (i.e., the end of fiber 104 attached to substrate 106) includes a first double-cantilever structure 1202 that permits lateral compliance in a first lateral direction. In particular, structure 1202 includes two parallel sides 1204 separated by a gap 1206, which permit lateral compliance in a direction perpendicular to sides 1204. In the present exemplary embodiment, the base of fiber 104 also includes a second double-cantilever structure 1208 that permits lateral compliance in a second lateral direction. In particular, structure 1208 includes two parallel sides 1210 separated by a gap 1212, which permit lateral compliance in a direction perpendicular to sides 1210. As depicted in FIG. 12, structure 1208 is stacked on top of structure 1202. Additionally, sides 1204 of structure 1202 and sides 1210 of structure 1208 are oriented in two different directions to permit lateral compliance in two different directions. It should be recognized, however, that the base of fiber 104 can include any number of double-cantilever structures to permit lateral compliance in any number of desired directions.

The double-cantilever structures can be fabricated using stereolithography. See, K. Ikuta, K. Hirowatari, and T. Ogata, "Three Dimensional Micro Integrated Fluid Systems (MIFS) Fabricated by Stereo Lithography", Proc. IEEE Micro Electro Mechanical Systems, pp. 1-6, Oiso, Japan Jan. 25-28, 1994, which is incorporated herein by reference in its entirety. It should be recognized, however, that the double-cantilever structure can be fabricated using various fabrication techniques, such as by casting into a mold fabricated with deep reactive ion etching.

Figure 13:
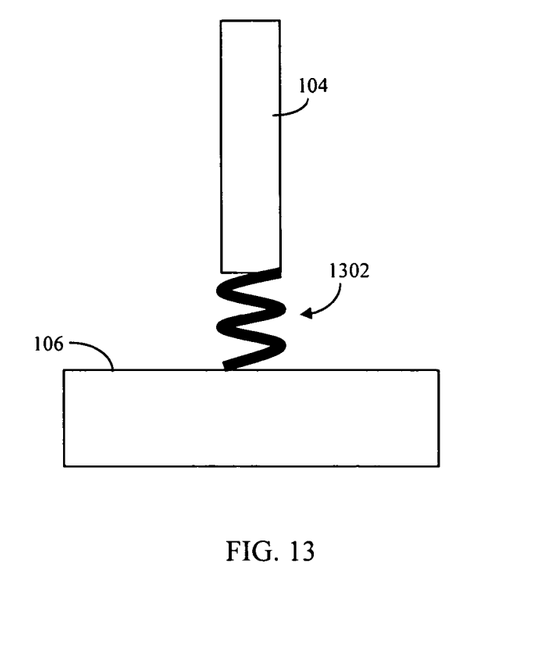
FIG. 13 depicts an exemplary fiber with a spring structure as a base.

With reference to FIG. 13, in another exemplary embodiment, the base of fiber 104 can include a spring structure 1302 to permit lateral and rotational compliance. In particular, in the present exemplary embodiment, the base of fiber 104 includes a coiled spring portion to permit lateral and rotational compliance in multiple directions.

The coiled spring structure can be fashioned using stereolithography. See, K. Ikuta, K. Hirowatari, and T. Ogata, "Three Dimensional Micro Integrated Fluid Systems (MIFS) Fabricated by Stereo Lithography", *Proc. IEEE Micro Electro Mechanical Systems*, pp. 1-6, Oiso, Japan Jan. 25-28, 1994), which is incorporated herein by reference in its entirety. It should be recognized, however, that the coiled spring structure can be fabricated using various fabrication techniques, such as chemical vapor deposition. See, Sean Pursel, Mark W. Horn, Melik C. Demirel and Akhlesh Lakhtakia, "Growth of sculptured polymer submicronwire assemblies by vapor deposition," Polymer, v. 46, pg. 9544-9548, 2005, which is incorporated herein by reference in its entirety.

Figure 14:
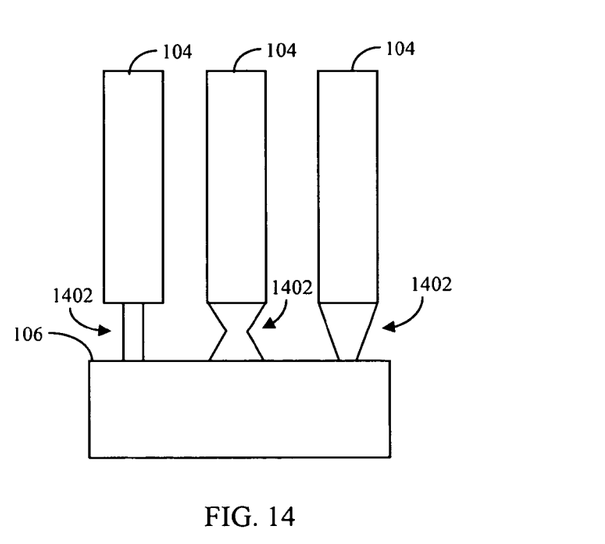
FIG. 14 depicts an exemplary fiber with a flexure support structure as a base.

With reference to FIG. 14, in another exemplary embodiment, the base of fiber 104 can include a flexure support structure 1402 to permit rotational compliance. As depicted in FIG. 14, flexure support structure 1402 can be formed to be more slender than the other portions of fiber 104. Flexure support structure 1402 can be fabricated by tapering an individual fiber at its base using various fabrication techniques include, but are not limited to, etching, casting, and drawing.

Figure 15:
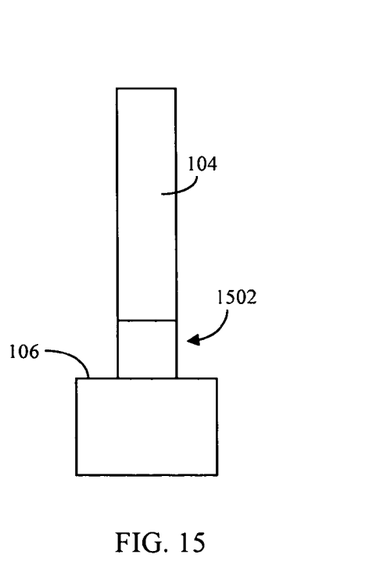
FIG. 15 depicts an exemplary fiber with a support structure composed of flexible material.

As also depicted in FIG. 15, in still another exemplary embodiment, a support structure 1502 of the base of fiber 104 can be composed of a flexible material that is less stiff than the other portions of fiber 104 to permit rotational compliance. For example, support structure 1502 of the base of fiber 104 can be composed of rubber.

With reference to FIGS. 16A-16D, an exemplary process of fabricating an array of fibers 104 on a compliant substrate 106 is depicted. In the example described below, fibers 104 are formed of epoxy, and compliant substrate 106 is formed from silicone rubber. It should be recognized, however, that fibers 104 and compliant substrate 106 can be made from various types of materials.

Figure 16A:
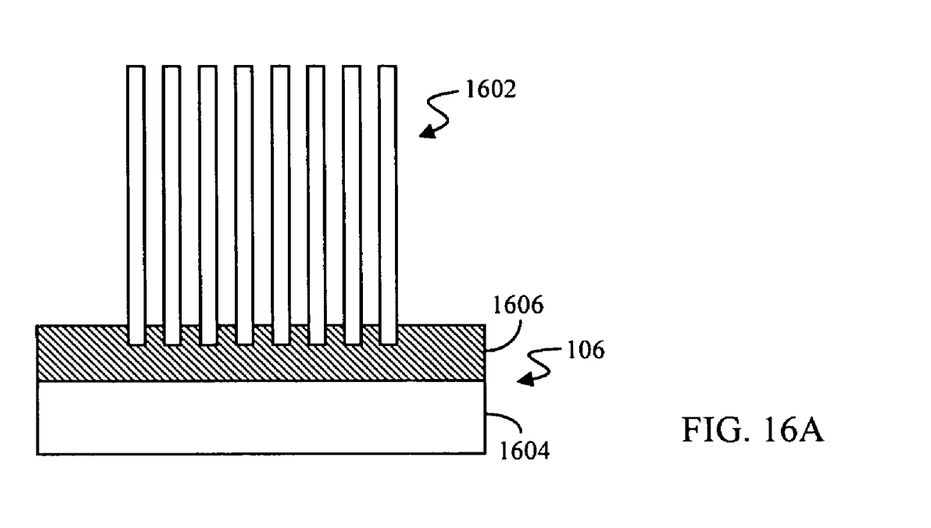
FIGS. 16A-16D depict an exemplary process of fabricating an array of fibers on a compliant substrate.

As depicted in FIG. 16A, a template 1602 having an array of holes is inserted into compliant substrate 106. In particular, in the present example, the process begins with a 25 µm polyester sheet 1604. Using a 25-50 µm mask, a layer of silicone adhesive 1606 is applied onto polyester sheet 1604. In particular, layer of silicone adhesive 1606 is squeegeed on to polyester sheet 1604. Before the layer of silicon adhesive 1606 is fully cured, template 1602 is gently placed into layer of silicone adhesive 1606.

Template 1602 can be an array of pores, such as a Whatman Anodisc nanopore array with 200 nm holes and 60 micron thickness. Template 1602 can also be filter or porous membranes, such as nanochannel alumina, track etched poly carbonate membranes, and the like. When a nanopore array is used, care should be taken when inserting the nanopore array into layer of silicone adhesive 1606 to not force the silicone adhesive all the way through the nanopore array.

Figure 16B:
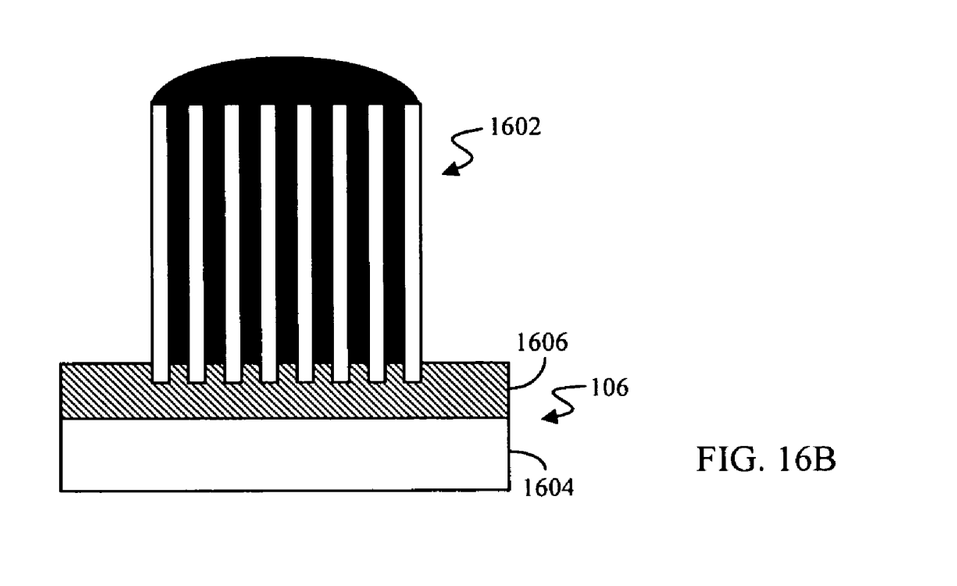

As depicted in FIG. 16B, the material for the fibers is applied to the top of template 1602. In particular, in one exemplary application where template 1602 is a nanopore array, a layer of epoxy, such as 2 part Marine epoxy, which can be obtained from Tap Plastics of Dublin, Calif., is applied to the top of the nanopore array. The nanopore array is placed under vacuum for approximately 1 minute to remove air bubbles and to fill the channels. The completed array is cured in a vacuum oven at approximately 100 degrees Celsius for several hours to completely cure the epoxy and bond it to the silicone rubber.

Figure 16C:
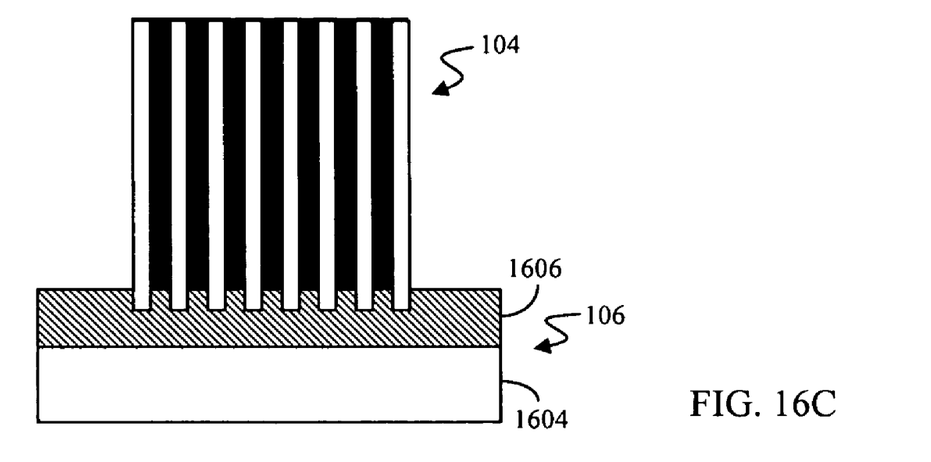

As depicted in FIG. 16C, the top of template 1602 is planarized. In particular, in the present example, the top of template 1602 is gently sanded with 400 grit silicon carbide sand paper to remove excess epoxy and to control the length of fibers 104.

Figure 16D:
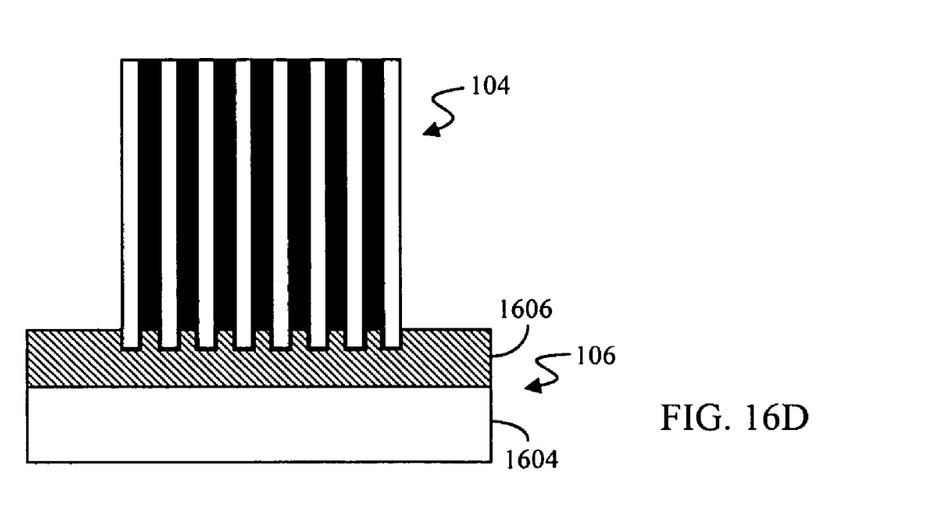

As depicted in FIG. 16D, template 1602 (FIG. 16C) is removed to release fibers 104. In particular, in one exemplary application where template 1602 is a nanopore array, the nanopore array is etched away in 1 Normality NaOH in an ultrasonic bath at 30 degrees Celsius for 15 minutes. The array of fibers 104 is rinsed in tap water and allowed to dry at room temperature.

After drying, the array of fibers 104 is not very adhesive since fibers 104 are sticking straight up. By applying a shear stress, such as by dragging the array on glass in one direction, or grooming fibers 104 with a cotton swab, fibers 104 can be oriented on their sides. Fibers can then engage a smooth surface, such as glass.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A fabricated microstructure, comprising:
   a substrate;
   a primary fiber having a width less than about 5 microns; and
   a plurality of base fibers, each base fiber having a first end attached to the primary fiber and a second end attached to the substrate, wherein each base fiber has a width less than the width of the primary fiber.

2. The fabricated microstructure of claim 1, wherein the plurality of base fibers is formed as an array attached to the primary fiber.

3. The fabricated microstructure of claim 1, wherein the width of the primary fiber is about ten times larger than the width of each one of the base fibers.

4. The fabricated microstructure of claim 1, wherein the plurality of base fibers and the primary fiber are formed from the same material.

5. The fabricated microstructure of claim 1, wherein the plurality of base fibers permits compliance of the primary fiber.

6. The fabricated microstructure of claim 1, wherein the plurality of base fibers are formed as a first structure, wherein the first structure comprises two parallel sides separated by a gap, and wherein the first structure permits compliance of the primary fiber in a first direction perpendicular to the two parallel sides of the first structure.

7. The fabricated microstructure of claim 6, further comprising:
   a second structure comprising two parallel sides separated by a gap, wherein the second structure permits compliance of the primary fiber in a second direction perpendicular to the two parallel sides of the second structure, wherein the first and second directions are different.

8. The fabricated microstructure of claim 7, wherein the second structure is stacked on top of the first structure.

9. The fabricated microstructure of claim 8, wherein the two parallel sides of the first structure are oriented perpendicular to the two parallel sides of the second structure, and wherein the first direction is perpendicular to the second direction.

10. The fabricated microstructure of claim 1, further comprising:
    a plurality of primary fibers arranged in an array, wherein the plurality of base fibers are arranged as an array, and wherein each primary fiber includes an array of base fibers.

11. The fabricated microstructure of claim 10, wherein the array of primary fibers and array of base fibers have area fractions of about 10 to 20 percent of areas with a base fiber or primary fiber to area without a base fiber or primary fiber.

12. A method of fabricating a microstructure having a plurality of micro- or nano-fibers attached to a compliant substrate, comprising:
    stacking a first porous mold on a second porous mold, wherein the first and second porous molds have different pore sizes, and wherein the first and second porous molds are shaped to form a plurality of primary fibers, each primary fiber having a width less than about 5 microns, and each primary fiber having a plurality of base fibers, wherein each base fiber has a width less than the width of the primary fiber;
    filling the stacked first and second porous molds with polymer;
    curing the polymer;
    after curing the polymer, etching away the first and second porous molds; and
    cutting the polymer using a cutting beam.

13. A fabricated microstructure, comprising:
    a substrate; and
    a micro- or nano-fiber having a base attached to the substrate, wherein the fiber has a width less than about 5 microns, wherein the base includes a first structure, and wherein the first structure comprises two parallel sides separated by a gap, wherein the first structure permits compliance of the fiber at the base in a first direction perpendicular to the two parallel sides of the first structure.

14. The fabricated microstructure of claim 13, wherein the base further includes:
    a second structure comprising two parallel sides separated by a gap, wherein the second structure permits compliance of the fiber at the base in a second direction perpendicular to the two parallel sides of the second structure, wherein the first and second directions are different.

15. The fabricated microstructure of claim 14, wherein the second structure is stacked on top of the first structure.

16. The fabricated microstructure of claim 15, wherein the two parallel sides of the first structure are oriented perpendicular to the two parallel sides of the second structure, and wherein the first direction is perpendicular to the second direction.

17. The fabricated microstructure of claim 13, wherein the fiber is formed from a polymer with an elastic modulus greater than 500 megapascals.

18. The fabricated microstructure of claim 17, wherein the fiber is formed from epoxy.

19. The fabricated microstructure of claim 13, wherein the substrate is formed from a compliant material.

20. The fabricated microstructure of claim 19, wherein the substrate is formed from a polymer with an elastic modulus less than 10 megapascals.

21. The fabricated microstructure of claim 20, wherein the substrate is formed from silicone rubber.

22. The fabricated microstructure of claim 13, wherein the substrate is formed from a cloth-like material.

* * * * *